(12) United States Patent
Chen

(10) Patent No.: US 12,240,698 B1
(45) Date of Patent: Mar. 4, 2025

(54) HOOK-TYPE HANDLING DEVICE, TRANSPORT EQUIPMENT AND TRANSPORT METHOD

(71) Applicant: Hongming Chen, Hong Kong (HK)

(72) Inventor: Hongming Chen, Hong Kong (HK)

(73) Assignee: Rainbow Dynamics LLC, Arlington, TX (US)

( * ) Notice: Subject to any disclaimer, the term of this patent is extended or adjusted under 35 U.S.C. 154(b) by 0 days.

(21) Appl. No.: 18/925,172

(22) Filed: Oct. 24, 2024

(51) Int. Cl.
*B65G 1/12* (2006.01)
*B25J 15/00* (2006.01)

(52) U.S. Cl.
CPC ............ *B65G 1/12* (2013.01); *B25J 15/0047* (2013.01)

(58) Field of Classification Search
CPC ............................... B25J 15/0047; B65G 1/12
USPC ......................................................... 414/280
See application file for complete search history.

(56) References Cited

U.S. PATENT DOCUMENTS

| | | | | |
|---|---|---|---|---|
| 6,094,321 A * | 7/2000 | Pollard | ............... | G11B 15/6805 |
| 8,231,324 B2 * | 7/2012 | Yoshida | ............... | B65G 1/0407 |
| | | | | 414/280 |
| 8,740,542 B2 * | 6/2014 | Wolkerstorfer | ...... | B65G 1/0435 |
| | | | | 414/280 |
| 8,753,060 B2 * | 6/2014 | Ueda | ...................... | B65G 35/00 |
| | | | | 700/214 |
| 9,365,347 B2 * | 6/2016 | Nakamura | ........... | B65G 1/0435 |
| 2006/0245862 A1 * | 11/2006 | Hansl | .................... | B65G 1/0435 |
| | | | | 414/281 |

FOREIGN PATENT DOCUMENTS

DE      4405952 A1 *   11/1994   ............... B66C 9/16

OTHER PUBLICATIONS

DE 4405952 A1 (Hoehne) Nov. 24, 1994 (English language machine translation). [online] [retrieved Dec. 4, 2024]. Retrieved from: espacenet. (Year: 1994).*

* cited by examiner

*Primary Examiner* — Jonathan Snelting
(74) *Attorney, Agent, or Firm* — Sam Pierce

(57) ABSTRACT

The present invention provides a hook-type handling device, transport equipment and a transport method. The hook-type handling device includes a base; a hook mechanism slidably connected to the base along a first direction, wherein the hook mechanism includes a hook claw and a first drive mechanism for driving the hook claw to rotate up and down; and a second drive mechanism disposed on the base, wherein the second drive mechanism is configured for driving the hook mechanism to slide in the first direction. The present invention can solve the problem that the handling mechanism of the prior art results in a low storage density of containers and is not suitable for hollowed-out containers.

15 Claims, 5 Drawing Sheets

HOOK-TYPE HANDLING DEVICE, TRANSPORT EQUIPMENT AND TRANSPORT METHOD

TECHNICAL FIELD

The present invention relates to the technical field of warehousing equipment, and in particular to a hook-type handling device, transport equipment and a transport method.

BACKGROUND ART

At present, in automated warehousing systems, the transport equipment mostly use clamping and holding type or sucker type handling mechanisms to load and unload containers on shelves. When the clamping and holding type handling mechanism is used, the fork arms thereof is required to extend to two sides of the container to clamp and hold the container. Therefore, when the container is stored on the shelf, a space (about 100 mm) for the fork arms thereof to extend into is required to be reserved, resulting in a low storage density of the containers. When the sucker type handling mechanism is used, the hollowed-out container cannot be operated.

SUMMARY OF THE INVENTION

In order to solve the problem that the handling mechanism of the prior art results in a low storage density of containers and is not suitable for hollowed-out containers, the present invention provides a hook-type handling device, transport equipment and a transport method.

In order to achieve the above object, the present invention adopts the following technical solution.

In a first aspect, the present invention provides a hook-type handling device including:
  a base;
  a hook mechanism slidably connected to the base along a first direction, wherein the hook mechanism includes a hook claw and a first drive mechanism for driving the hook claw to rotate up and down; and
  a second drive mechanism disposed on the base, wherein the second drive mechanism is configured for driving the hook mechanism to slide in the first direction.

Further, the base is provided with a slide rail extending in the first direction; and the bottom of the hook mechanism is provided with a slide block slidably connected to the slide rail.

Further, the second drive mechanism is implemented by using a synchronous belt telescopic assembly;
  the synchronous belt telescopic assembly includes a telescopic synchronous belt, a driving wheel of the telescopic synchronous belt, a driven wheel of the telescopic synchronous belt, and a second drive motor;
  the telescopic synchronous belt is disposed adjacent to the slide rail along the first direction, and the slide block is fixedly connected to the telescopic synchronous belt; and
  the second drive motor is disposed on a bottom surface of the base, and is configured for driving the driving wheel of the telescopic synchronous belt to cause the telescopic synchronous belt for reciprocating motions.

Further, the driving wheel of the telescopic synchronous belt is disposed at one end of the telescopic synchronous belt; or the driving wheel of the telescopic synchronous belt is disposed between both ends of the telescopic synchronous belt and engaged with the telescopic synchronous belt.

Further, the hook mechanism further includes a hook seat for mounting the hook claw and the first drive mechanism, wherein the first drive mechanism causes the hook claw to rotate about the hook seat.

Further, the hook mechanism further includes a third drive mechanism for rotating the hook seat in a horizontal direction, the third drive mechanism including:
  a rotary table configured for driving the hook seat to rotate in the horizontal direction;
  a third drive motor configured for driving the rotary table to rotate; and
  a mounting seat configured for mounting the rotary table and the third drive motor.

Further, the rotary table is mounted on the mounting seat by a pedestal;
  wherein a positioning assembly is provided on the rotary table and the pedestal for positioning a rotational position of the rotary table relative to the pedestal.

Further, the positioning assembly includes a positioning block disposed on the rotary table, and a positioning sensor disposed on the pedestal; or
  the positioning assembly includes a positioning block disposed on the pedestal, and a positioning sensor disposed on the rotary table.

Further, the hook seat is further provided with a code sweeper.

Further, the handling device further includes a synchronous belt transport mechanism mounted on the base; the synchronous belt transport mechanism includes a fourth drive motor, and at least two transport synchronous belt assemblies driven by the fourth drive motor; and the at least two transport synchronous belt assemblies are disposed in parallel on both sides of the hook mechanism in the first direction.

Further, each of the transport synchronous belt assemblies respectively includes a transport synchronous belt, a driving wheel of the transport synchronous belt and a driven wheel of the transport synchronous belt;
  wherein each of the driving wheels of the transport synchronous belt is sheathed on a same wheel shaft of the transport synchronous belt; and the wheel shaft of the transport synchronous belt is rotatably connected to the fourth drive motor.

Further, both sides of the base are provided with oppositely disposed support plates, the support plates extending in the first direction;
  wherein both ends of the wheel shaft of the transport synchronous belt are respectively fixed to the two of the support plates.

Further, the base is further provided with oppositely disposed guide side plates on both sides.

In a second aspect, the present invention provides transport equipment including a longitudinal support, a lifting mechanism, a translation mechanism and a hook-type handling device as previously described;
  wherein the hook-type handling device is mounted on the lifting mechanism; the lifting mechanism is mounted on the longitudinal support; and the longitudinal support is mounted on the translation mechanism.

Further, the longitudinal support includes a first upright and a second upright oppositely disposed in the longitudinal direction;

the lifting mechanism includes a first lifting synchronous belt assembly, a second lifting synchronous belt assembly, and a lifting drive motor configured for driving the first lifting synchronous belt assembly and the second lifting synchronous belt assembly to synchronously reciprocate via a wheel shaft of the lifting synchronous belt;

wherein the first lifting synchronous belt assembly is disposed along the first upright; the second lifting synchronous belt assembly is disposed along the second upright; and the hook-type handling device is fixedly connected to both the first lifting synchronous belt assembly and the second lifting synchronous belt assembly.

Further, the translation mechanism includes:

a guide rail fixedly disposed along the horizontal direction of a shelf; and a walking mechanism fixedly mounted on the longitudinal support and cooperating with the guide rail.

Further, the translation mechanism includes at least two guide rails respectively disposed along upper and lower portions of the shelf, and at least two walking mechanisms are mounted on the longitudinal support; and the walking mechanisms are provided in one-to-one correspondence with the guide rails.

Further, the walking mechanism includes a drive wheel cooperating with the guide rail, and a translational drive motor for rotating the drive wheel.

In a third aspect, the invention provides a transport method implemented on the aforementioned transport equipment, including:

acquiring a transporting instruction, wherein the transporting instruction includes an initial position and a target position of a container to be transported;

controlling the lifting mechanism and the translation mechanism to move the hook-type handling device to the initial position;

controlling the hook-type handling device to hook the container to be transported and move the container to be transported above the base;

controlling the lifting mechanism and the translation mechanism to move the hook-type handling device to the target position; and controlling the hook-type handling device to place the container to be transported at the target position.

Further, a first layer of the shelf is configured as a buffer layer, and the remaining layers are configured as storage layers;

when the initial position is a container position of the buffer layer, the target position is a container position of the storage layer;

when the initial position is a container position of the storage layer, the target position is a container position of the buffer layer; and wherein the transport method further includes moving the container to the buffer layer by a mobile robot, or moving a container of the buffer layer to a specified location.

By adopting the above technical solution, the present invention has the following advantageous effects.

When the handling mechanism of the present invention is used to load and unload the containers, the hook mechanism can slide forwards to the position of the containers in the first direction, and after hooking the containers under the action of the first drive mechanism, returns backwards to the original position in the first direction so that the containers can be borne above the base. After the device is moved to the designated loading and unloading position, the hook mechanism carrying the containers is driven to slide forwards in the first direction again. After the hook mechanism sliding to the position, the hook claw is driven to release the containers via the first drive mechanism, so that the reliable loading and unloading of the containers can be achieved, and the containers are not required to reserve a space for the fork arms to extend into during storage. The storage space utilization rate is greatly improved. The present invention is also applied to hollowed-out containers.

DETAILED DESCRIPTION OF THE INVENTION

Figure 1:
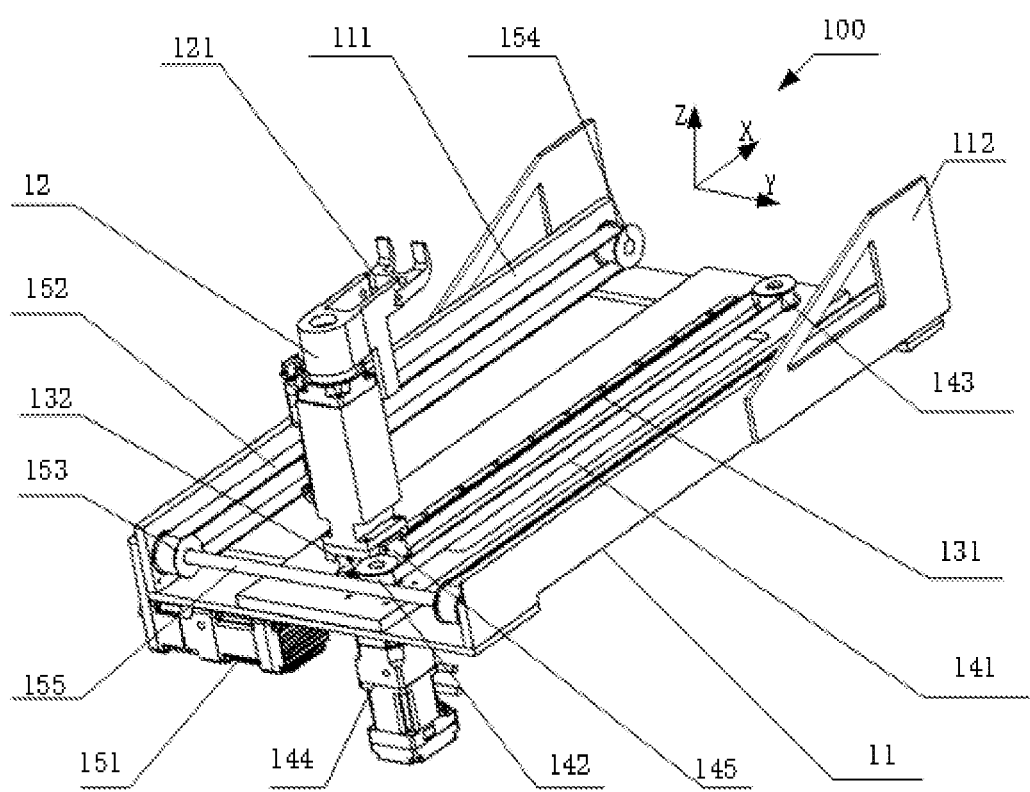
FIG. 1 is a structurally schematic view of a hook-type handling device according to Embodiment 1 of the present invention.

In order that the objects, aspects and advantages of the present invention will become more apparent, a more particular description of the invention will be rendered by reference to the appended drawings and the embodiments. It should be understood that the specific examples described herein are merely used for explanation of the invention and are not intended to be limiting thereof. Based on the examples in the invention, all other examples obtained by a person skilled in the art without involving any inventive effort are within the scope of protection of the invention.

The terminology used in the invention herein is for the purpose of describing particular embodiments only and is not intended to be limiting of the disclosure. As used in the disclosure and the appended claims, the singular forms "a", "an", and "the" are intended to include the plural forms as well, unless the context clearly indicates otherwise. It should also be understood that the term "and/or" as used herein refers to and encompasses any and all possible combinations of one or more of the associated listed items.

Embodiment 1

The present embodiment provides a hook-type handling device. As shown in FIGS. 1-4, the hook-type handling device 100 generally includes a base 11 and a hook mechanism 12 slidably connected to the base in a first direction (i.e., an X-direction). Here, the first direction is perpendicular to the extension direction (i.e., a Y direction) of a shelf (not shown). The hook mechanism 12 mainly includes a hook claw 121 and a first drive mechanism 122 for driving the hook claw 121 to rotate up and down to hook or put down a container (not shown). It should be understood that the container should be provided with a connection portion (such as a hole or a groove) cooperating with the hook claw 121.

Referring again to FIG. 1, the handling device 100 in this embodiment further includes a second drive mechanism disposed on the base 11. The second drive mechanism is configured for driving the hook mechanism 12 to slide forwards or backwards in a first direction, thereby achieving fore and aft telescoping of the hook mechanism 12. Here, the sliding connection is achieved by the base 11 and the hook mechanism 12 in cooperation with a slide rail 131 and a slide block 132. Specifically, as shown in FIG. 1, the slide rail 131 is disposed on the base 11 and extends along a first direction, and the slide block 132 is disposed at the bottom of the hook mechanism 12.

In an implementation, the second drive mechanism is implemented by a synchronous belt telescopic assembly. Referring to FIG. 1, the synchronous belt telescopic assembly includes a telescopic synchronous belt 141, a driving wheel 142 of the telescopic synchronous belt, a driven wheel 143 of the telescopic synchronous belt, and a second drive motor 144. Here, the telescopic synchronous belt 141 is disposed adjacent to the slide rail and also extends along the first direction. The slide block 132 and the telescopic synchronous belt 141 are fixedly connected via the first synchronous belt fixing plate. The second drive motor 144 is disposed on the bottom surface of the base 11, and is configured for driving the driving wheel 142 of the telescopic synchronous belt to drive the reciprocating motion of the telescopic synchronous belt 141, thereby driving the slide block 132, and the hook mechanism 12 above the slide block 132 to move back and forth in the first direction. In the embodiment shown in FIG. 1, a driving wheel 142 of the telescopic synchronous belt and a driven wheel 143 of the telescopic synchronous belt are respectively located at opposite ends of the base 11 in the first direction, and the driving wheel 142 of the telescopic synchronous belt is rotatably connected to the second drive motor 144.

Figure 2:
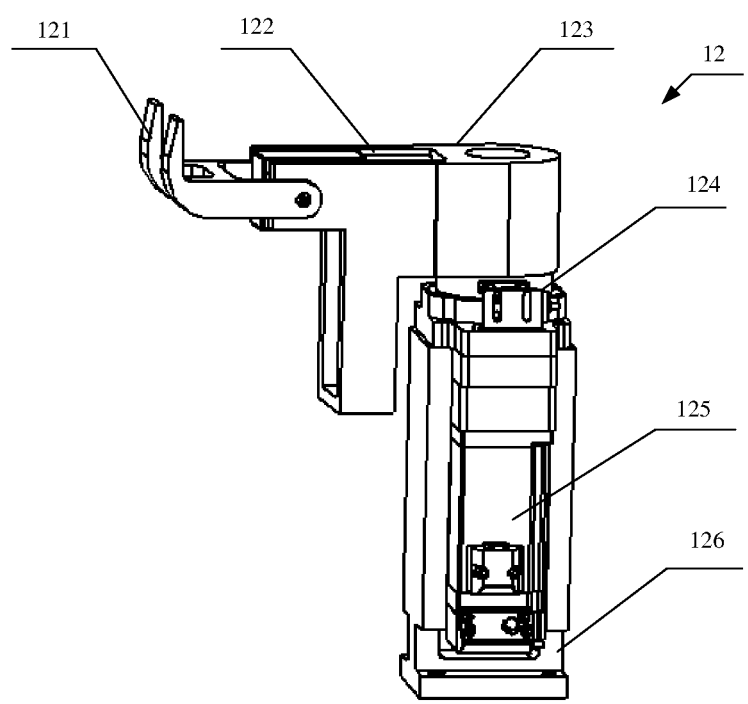
FIG. 2 is a structurally schematic view of a hook mechanism according to Embodiment 1 of the present invention.
Figure 3:
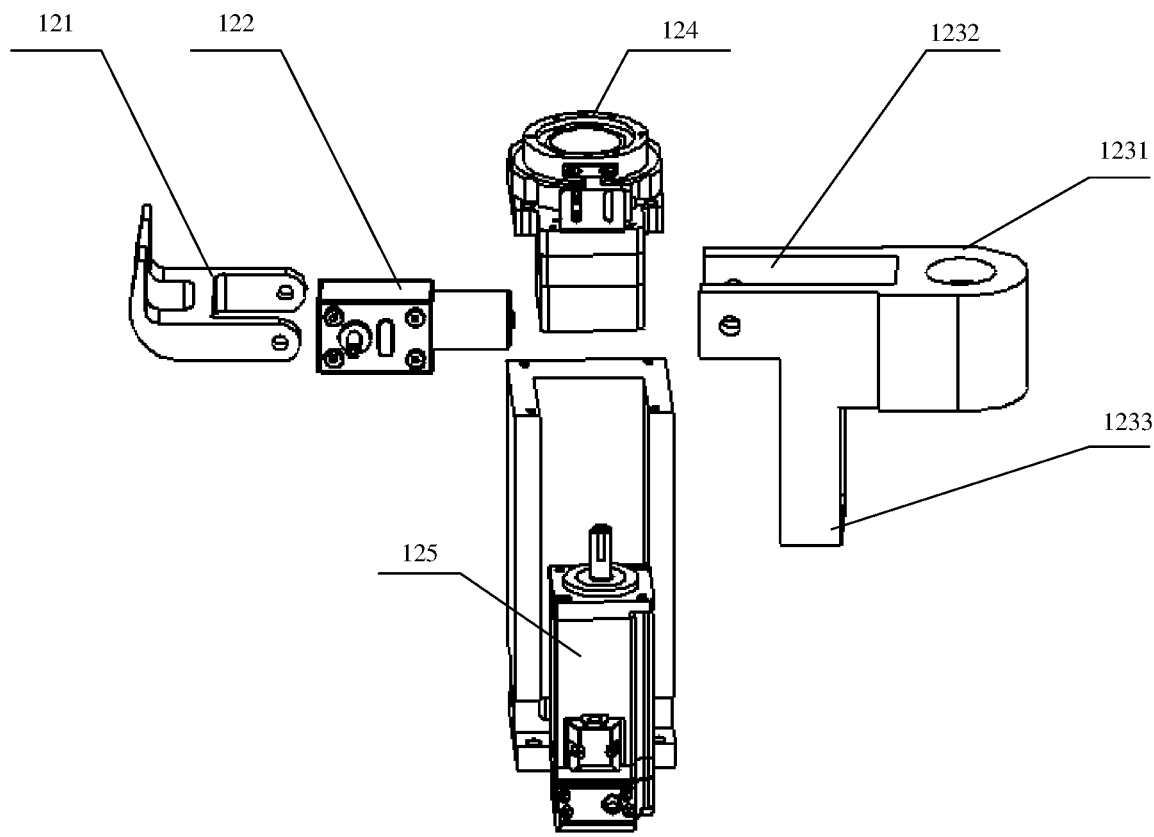
FIG. 3 is an exploded view of the hook mechanism according to Embodiment 1 of the present invention.
Figure 4:
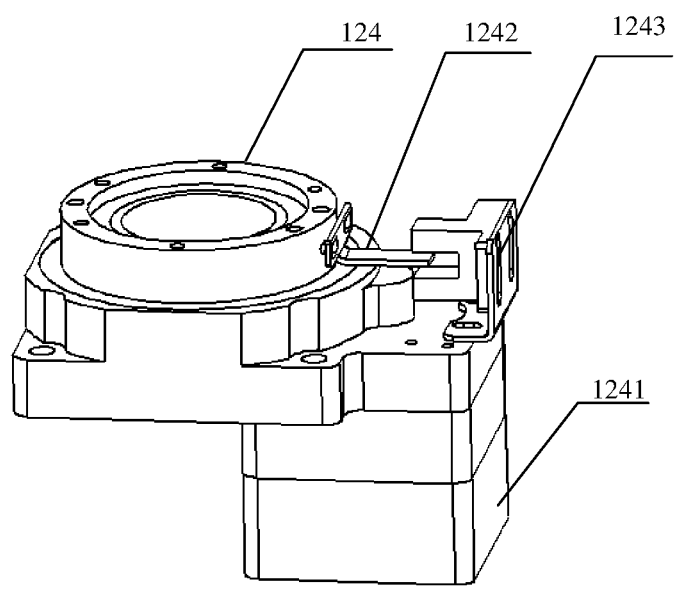
FIG. 4 is a structurally schematic view of a rotary table according to Embodiment 1 of the present invention.

Referring to FIGS. 2 to 4, the hook mechanism 12 of the present embodiment further includes a hook seat 123 for mounting the hook claw 121 and the first drive mechanism 122. The first drive mechanism 122 is capable of driving the hook claw 121 to rotate up and down about the hook seat 123. Specifically, as shown in FIGS. 2 and 3, the hook seat 123 includes a seat body 1231 and a fork arm 1232 fixedly connected to the seat body 1231. The fork arm 1232 is horizontally disposed and forms a space capable of laterally mounting the first drive mechanism 122 (specifically, using the first drive motor). One end of the hook claw 121 is a connecting end which is rotatably mounted on the fork arm 1232 and is fixedly connected to the output shaft of the first drive motor. The other end of the hook claw 121 faces outwards and is bent in a hooking shape to hook the container.

In addition, referring again to FIG. 3, the hook 123 also includes a detection assembly mounting portion 1233 attached longitudinally below the fork arm 1232 for mounting a detection assembly such as a scanner for scanning an identification code on the container to determine whether the hook mechanism 12 has moved to the position of the designated container based on the identification code.

In an implementation, to facilitate the omni-directional hooking of the container by the hook mechanism 12, the hook mechanism 12 further includes a third drive mechanism for rotating the hook seat 123 in a horizontal direction, again as shown in FIGS. 1-3. In particular, the third drive mechanism includes a rotary table 124 configured for driving the hook seat 123 to rotate in a horizontal direction, a third drive motor 125 configured for driving the rotary table 124 to rotate, and a mounting seat 126 configured for mounting the rotary table 124 and the third drive motor 125, the mounting seat 126 being fixedly mounted on the slide block 132 via a fastener.

As shown in FIG. 4, the rotary table 124 may be mounted on the mounting seat 126 via a pedestal 1241. A speed reducer is provided inside the pedestal 1241,. The third drive motor 125 drives the rotary table 124 to rotate relative to the pedestal 1241 via the speed reducer. In addition, the rotary table 124 and the pedestal 1241 may be provided with a positioning assembly configured for positioning the rotational position of the rotary table 124 relative to the pedestal. In an embodiment shown in FIG. 4, the positioning assembly includes a positioning block 1242 disposed on the rotary table 124, and a positioning sensor 1243 (e.g., an infrared sensor) disposed on the pedestal. When the positioning sensor detects the positioning block, it may indicate that the rotary table 124 has been rotated such that the hook claw 121 is facing the shelf. It should be understood that it is also possible to mount the positioning block on the pedestal and the positioning sensor on the rotary table 124. In addition, other forms of positioning assemblies may be used. The present embodiment does not impose any particular limitation on the form of positioning assemblies.

Referring again to FIG. 1, the handling device 100 of this embodiment may further include a synchronous belt transport mechanism mounted on the base 11. Specifically, the synchronous belt transport mechanism includes a fourth drive motor 151, and at least two transport synchronous belt assemblies driven by the fourth drive motor 151, which are disposed in parallel on both sides of the hook mechanism 12 in the first direction. Thus, during the travel in the first direction after the container is hooked by the hook device 100, the container can be assisted to move by the synchronous belt transport mechanism.

In the embodiment shown in FIG. 1, each of the transport synchronous belt assemblies may include a transport synchronous belt 152, a driving wheel 153 of the transport synchronous belt and a driven wheel 154 of the transport synchronous belt. Herein, each driving wheel 153 of the transport synchronous belt is sheathed on the same wheel shaft 155 of the transport synchronous belt, and the wheel shaft 155 of the transport synchronous belt is rotatably connected to the fourth drive motor 151, so that the wheel shaft 155 of the transport synchronous belt is driven by the fourth drive motor 151 to drive each driving wheel 153 of the transport synchronous belt to rotate synchronously, thereby achieving stable movement of the container.

In the embodiment shown in FIG. 1, support plates 111 extending in the first direction are oppositely disposed on both sides of the base 11, and both ends of the wheel shaft 155 of the transport synchronous belt are vertically fixed to the two support plates 111, respectively. Here, the driven wheel 154 of the transport synchronous belt is disposed at one end of the base 11 adjacent to the shelf, and the wheel shaft 155 of the transport synchronous belt and the driving wheel 153 of the transport synchronous belt are disposed at one end of the base 11 away from the shelf.

In addition, oppositely disposed guide side plates 112 are disposed on both sides of the base 11 for guiding the movement of the container.

When the handling mechanism of the present embodiment is used to load and unload the containers, the hook mechanism 12 can slide forwards to the position of the containers in the first direction, and after hooking the containers under the action of the first drive mechanism 122, returns backwards to the original position in the first direction so that the container can be borne above the base 11. After the device 100 is moved to the designated loading and unloading position, the hook mechanism 12 carrying the containers is driven to slide forwards in the first direction again. After the hook mechanism 12 sliding to the position, the hook claw 121 is driven to release the containers via the first drive mechanism 122, so that the reliable loading and unloading of the containers can be achieved. The containers can be stored without reserving a space into which the clamping fork arms extend (only about 20 mm can be reserved between the containers), and the storage density increases. Taking a common container with a size of 600*400*200 mm as an example, assuming that the shelf has a length of 2,260 mm and a height of 4,350 mm, and the accumulated number of layers is 11, the number of conventional containers is 4*11=44, and the number of containers that can be accommodated with this embodiment is 5*11=55. A single group of shelves can be increased in the capacity by 25%, and the space utilization rate is greatly improved. The same is applied to hollowed-out containers.

Embodiment 2

Figure 5:
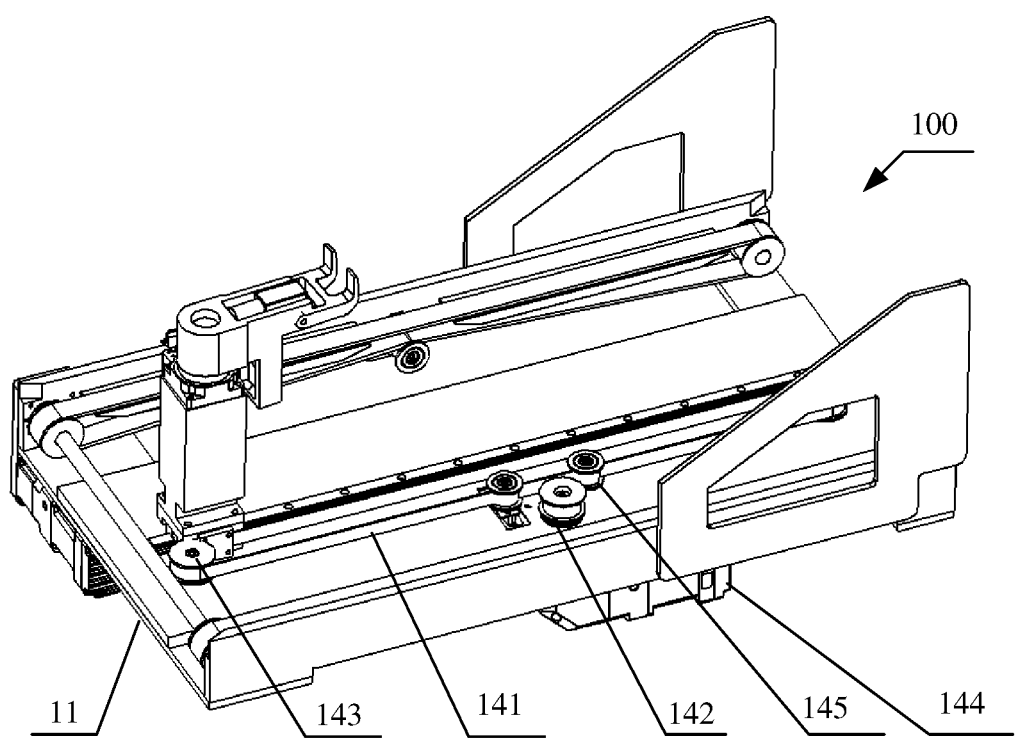
FIG. 5 is a structurally schematic view of a hook-type handling device according to Embodiment 2 of the present invention.

The present embodiment provides a hook-type handling device 100, as shown in FIG. 5, which differs from Embodiment 1 in that another embodiment of a synchronous belt telescopic assembly is provided. Specifically, a driven wheel of the telescopic synchronous belt 143 is disposed at both ends of the telescopic synchronous belt 141. A driving wheel 142 of the telescopic synchronous belt is disposed in the middle of the telescopic synchronous belt 141 and engaged with the telescopic synchronous belt 141. A second drive motor 144 is provided below the driving wheel 142 of the telescopic synchronous belt. This embodiment has the advantage over Embodiment 1 that it avoids interference of the second drive motor 144 to the detection assembly on the hook mechanism.

Here, as shown in FIG. 5, the synchronous belt telescopic assembly further includes a tensioning wheel set 145. The tensioning wheel set 145 is configured for tensioning the telescopic synchronous belt 141, and can tighten the telescopic synchronous belt 141 on the driving wheel 142 of the telescopic synchronous belt so as to enhance the meshing action between the telescopic synchronous belt 141 and the driving wheel 142 of the telescopic synchronous belt, thereby ensuring the stable operation of the synchronous belt telescopic assembly.

Embodiment 3

Figure 6:
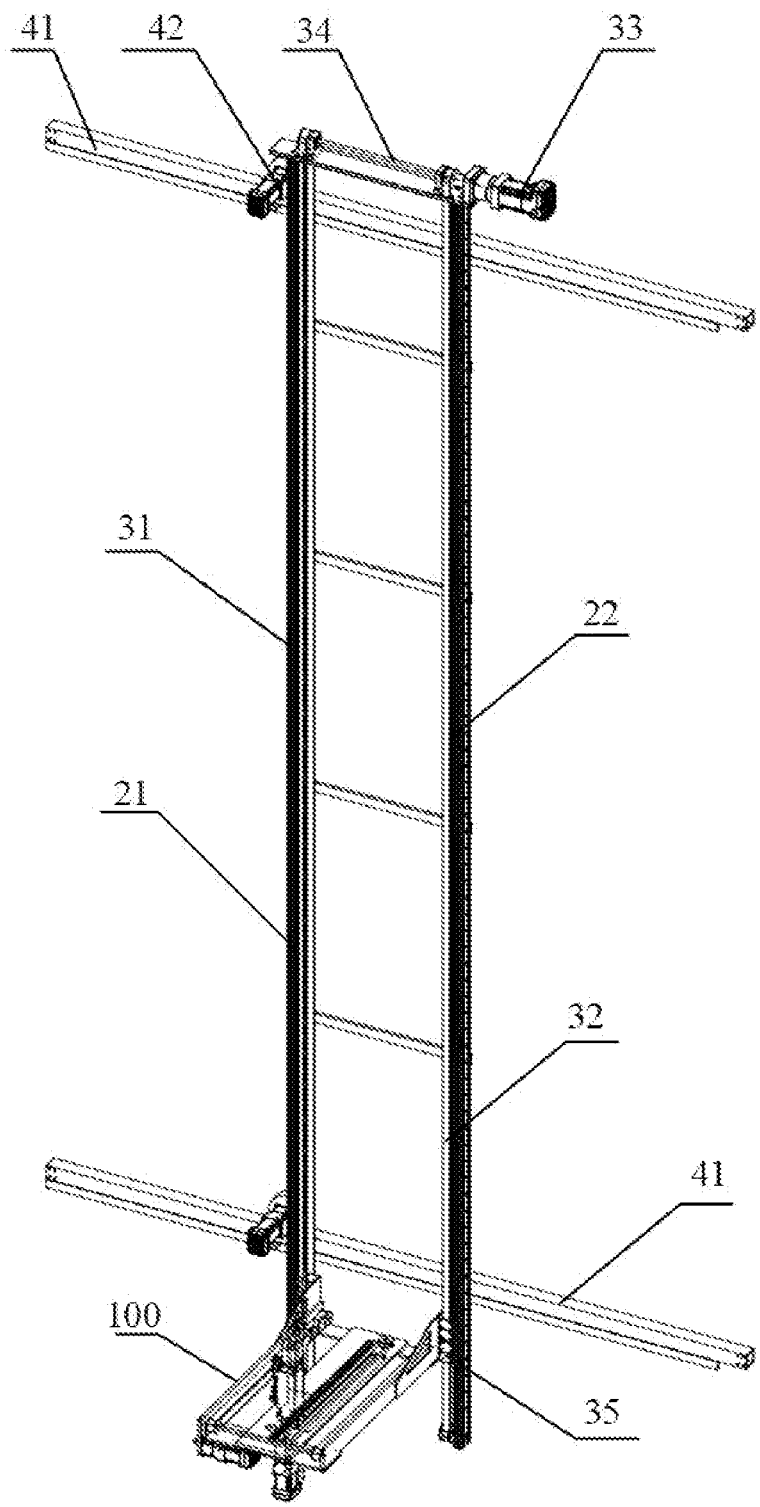
FIG. 6 is a structurally schematic view of transport equipment according to Embodiment 3 of the present invention.

The present embodiment provides a transport equipment, as shown in FIG. 6, including a longitudinal support, a lifting mechanism, a translation mechanism, and a hook-type handling device 100 as provided in Embodiment 1 or 2. Here, the hook-type handling device 100 is mounted on the lifting mechanism. The lifting mechanism is mounted on the longitudinal support. The longitudinal support is mounted on the translation mechanism. The translation mechanism is disposed along the length direction of the shelf. Thus, by the action of the lift mechanism and the translation mechanism, the hook-type handling device 100 can be moved to a desired position to hook or drop a container, enabling automatic handling of the containers.

In the present embodiment, the longitudinal support includes first and second uprights 21 and 22 arranged opposite to each other in the longitudinal direction, and the first and second uprights 21 and 22 are connected to each other by a plurality of connecting members.

In this embodiment, the lifting mechanism includes a first lifting synchronous belt assembly 31, a second lifting synchronous belt assembly 32 and a lifting drive motor 33. The lifting drive motor 33 is configured for driving the first lifting synchronous belt assembly 31 and the second lifting synchronous belt assembly 32 to synchronously reciprocate via a wheel shaft 34 of the lifting synchronous belt so as to ensure the synchronism of the both. Here, the first lifting synchronous belt assembly 31 is disposed along the first upright 21. The second lifting synchronous belt assembly 32 is disposed along the second upright 22. The wheel shaft 34 of the lifting synchronous belt and the lifting drive motor 33 are disposed at the top or bottom of the longitudinal support (shown as being arranged at the top in FIG. 6).

In the present embodiment, the hook-type handling device 100 is fixedly connected to both the first lifting synchronous belt assembly 31 and the second lifting synchronous belt assembly 32 to ascend or descend in accordance with the synchronous reciprocating motion of the first lifting synchronous belt assembly 31 and the second lifting synchronous belt assembly 32. Specifically, the guide side plates 112 on both sides of the hook-type handling device 100 are fixedly connected to the first lifting synchronous belt assembly 31 and the second lifting synchronous belt assembly 32 via the second synchronous belt fixing plate, respectively, so as to ensure that the hook-type handling device 100 is firmly installed.

Referring again to FIG. 6, the translation mechanism of this embodiment includes: a guide rail 41 fixedly disposed along the horizontal direction of the shelf, and a walking mechanism 42 fixedly mounted on the longitudinal support and cooperating with the guide rail 41. Thus, by moving the travel mechanism 42 along the guide rail 41, the hook-type handling device 100 is operated in a horizontal direction.

Preferably, in order to ensure the balance of the hook-type handling device 100, the translation mechanism of the present embodiment includes at least two guide rails 41 (exemplarily shown as two in FIG. 6) disposed along the upper and lower portions of the shelf, respectively. Accordingly, at least two walking mechanisms 42 are matched and mounted on the longitudinal support, and each walking mechanism 42 is arranged in one-to-one correspondence with the guide rail 41, so that synchronous walking on the corresponding guide rail 41 drives the hook-type handling device 100 to translate.

In the present embodiment, each walking mechanism 42 specifically includes a driving wheel cooperating with the guide rail 41, and a translation drive motor rotatably connected to the driving wheel. Each translation drive motor operates synchronously to drive the corresponding driving wheel to rotate synchronously on the corresponding guide rail 41.

When it is necessary to transport a container, in the present embodiment, the hook-type handling device 100 may be moved to a desired position by the movement of the lifting mechanism and the translation mechanism, then slide forwards to the container in a first direction by driving the hook-type handling device 12, hook the container under the action of the first drive mechanism 122, and then return back to the original position in the first direction so that the container can be borne above the base 11. Then, the handling device 100 is moved to a designated loading/unloading position again by means of the lifting mechanism and the translation mechanism, and the hook mechanism 12 carrying the container is driven to slide forwards in the first direction again, and the hook claw 121 is driven to put down the container by means of the first drive mechanism 122 after sliding into place, so that reliable handling of the container can be achieved.

Embodiment 4

This embodiment provides a transport method implemented on the transport equipment of Embodiment 3, and specifically includes the following steps.

S1, a transporting instruction is acquired, wherein the transporting instruction includes an initial position and a target position of a container to be transported.

S2, the lifting mechanism and the translation mechanism are controlled to move the hook-type handling device to the initial position.

Specifically, respective control commands for the lifting drive motor 33 and the translation drive motor are first generated based on the initial position and the current position of the hook-type handling device 100, and then the lifting drive motor 33 and the translation drive motor are controlled to rotate accordingly according to the respective control commands to move the hook-type handling device 100 to the initial position.

S3, the control hook-type handling device 100 hooks the container to-be-handled and moves the container to be transported above the base 11.

Specifically, the second drive mechanism is controlled to drive the hook mechanism 12 to slide forwards in the first direction to the container, then the first drive mechanism 122 is controlled to drive the hook claw 121 to rotate to hook the container, and finally the second drive mechanism and the fourth drive mechanism are controlled to move the container to be carried above the base 11.

S4, the lifting mechanism and the translation mechanism are controlled to move the hook-type handling device 100 to the target position S4.

Specifically, respective control commands for the lifting drive motor 33 and the translation drive motor are first generated based on the initial position and the target position, and then the lifting drive motor 33 and the translation drive motor are controlled to rotate accordingly according to the respective control commands to move the hook-type handling device 100 to the target position.

S5, the hook-type handling device 100 is controlled to place the container to be transported at the target position.

Specifically, the second drive mechanism is first controlled to drive the catch mechanism 12 to slide forwards in the first direction to the foremost, then the first drive mechanism 122 is controlled to drive the hook claw 121 to rotate to drop the container, and finally the second drive mechanism is controlled to bring the catch mechanism 12 back to the original position.

Through the above steps, the container can be transported from the initial position to the target position, so that inventory and shipment can be efficiently realized.

In one implementation, the first layer of the shelf is configured as a buffer layer, and the remaining layers are configured as storage layers. When the inventory is required, an initial position is a container position of a buffer layer, and a target position is a container position of a storage layer. When the shipment is required, the initial position is a container position of the storage layer and the target position is a container position of the buffer layer.

The transport method of the present embodiment may further include that the container is moved by the mobile robot from a specified position (e.g., a picking station) to the buffer layer, or the buffer layer container is moved to a specified position. Thus, the automated warehouse service can be better adapted by the cooperation of the transport equipment and the mobile robot provided in Embodiment 2.

While only specific implementation of the present invention have been described above, it will be appreciated by those skilled in the art that the foregoing is illustrative only and that the scope of the present invention is defined by the appended claims. Those skilled in the art may make changes or modifications to these embodiments without departing from the principles and substance of the present invention, but these changes or modifications shall fall within the scope of protection of the present invention.

The invention claimed is:

1. A hook-type handling device, comprising:
   a base;
   a hook mechanism slidably connected to the base;
   a hook claw;
   a first drive mechanism for driving the hook claw to rotate up and down; and
   a second drive mechanism disposed on the base, wherein the second drive mechanism is configured for driving the hook mechanism to slide in a direction of the connection of the hook mechanism to the base,
   wherein the hook mechanism further comprises a hook seat for mounting the hook claw and the first drive mechanism, wherein the first drive mechanism causes the hook claw to rotate about the hook seat; and
   wherein the hook mechanism further comprises a third drive mechanism for rotating the hook seat in a horizontal direction, the third drive mechanism comprising:
   a rotary table configured for driving the hook seat to rotate in the horizontal direction;
   a third drive motor configured for driving the rotary table to rotate; and
   a mounting seat configured for mounting the rotary table and the third drive motor.

2. The hook-type handling device according to claim 1, wherein the base is provided with a slide rail extending in a first direction; and
   a bottom of the hook mechanism is provided with a slide block slidably connected to the slide rail.

3. The hook-type handling device according to claim 1, wherein the rotary table is mounted on the mounting seat by a pedestal;
   wherein a positioning assembly is provided on the rotary table and the pedestal for positioning a rotational position of the rotary table relative to the pedestal.

4. The hook-type handling device according to claim 3, wherein the positioning assembly comprises a positioning block disposed on the rotary table, and a positioning sensor disposed on the pedestal; or
   the positioning assembly includes a positioning block disposed on the pedestal, and a positioning sensor disposed on the rotary table.

5. The hook-type handling device according to claim 1, further comprising a synchronous belt transport mechanism mounted on the base, wherein the synchronous belt transport mechanism comprises a fourth drive motor, and at least two transport synchronous belt assemblies driven by the fourth drive motor; and the at least two transport synchronous belt assemblies are disposed in parallel on sides of the hook mechanism in a first direction.

6. The hook-type handling device according to claim 5, wherein each of the transport synchronous belt assemblies respectively comprises a transport synchronous belt, a driving wheel of the transport synchronous belt and a driven wheel of the transport synchronous belt;

wherein each of the driving wheels of the transport synchronous belt is sheathed on a same wheel shaft of the transport synchronous belt; and the wheel shaft of the transport synchronous belt is rotatably connected to the fourth drive motor.

7. The hook-type handling device according to claim 6, wherein sides of the base are provided with oppositely disposed support plates, the support plates extending in the first direction;

wherein ends of the wheel shaft of the transport synchronous belt are respectively fixed to the two of the support plates.

8. The hook-type handling device according to claim 1, wherein the base is further provided with oppositely disposed guide side plates on sides of the base.

9. A transport apparatus, comprising a longitudinal support, a lifting mechanism, a translation mechanism and the hook-type handling device according to claim 1, wherein the hook-type handling device is mounted on the lifting mechanism; the lifting mechanism is mounted on the longitudinal support; and the longitudinal support is mounted on the translation mechanism.

10. The transport apparatus according to claim 9, wherein the longitudinal support comprises a first upright and a second upright oppositely disposed in a longitudinal direction;

the lifting mechanism comprises a first lifting synchronous belt assembly, a second lifting synchronous belt assembly, and a lifting drive motor configured for driving the first lifting synchronous belt assembly and the second lifting synchronous belt assembly to synchronously reciprocate via a wheel shaft of the lifting synchronous belt;

wherein the first lifting synchronous belt assembly is disposed along the first upright; the second lifting synchronous belt assembly is disposed along the second upright; and the hook-type handling device is fixedly connected to both the first lifting synchronous belt assembly and the second lifting synchronous belt assembly.

11. The transport apparatus according to claim 9, wherein the translation mechanism comprises:

a guide rail fixedly disposed along a horizontal direction of a shelf; and a walking mechanism fixedly mounted on the longitudinal support and cooperating with the guide rail.

12. The transport apparatus according to claim 9, wherein the translation mechanism comprises at least two guide rails respectively disposed along upper and lower portions of the shelf, and at least two walking mechanisms are mounted on the longitudinal support; and the walking mechanisms are provided in one-to-one correspondence with the guide rails.

13. The transport apparatus according to claim 11, wherein the walking mechanism comprises a drive wheel cooperating with the guide rail, and a translational drive motor for rotating the drive wheel.

14. A transport method implemented on the transport apparatus according to claim 9, comprising:

acquiring a transporting instruction, wherein the transporting instruction comprises an initial position and a target position of a container to be transported;

controlling the lifting mechanism and the translation mechanism to move the hook-type handling device to the initial position;

controlling the hook-type handling device to hook the container to be transported and move the container to be transported above the base;

controlling the lifting mechanism and the translation mechanism to move the hook-type handling device to the target position; and controlling the hook-type handling device to place the container to be transported at the target position.

15. The transport method according to claim 14, wherein a first layer of the shelf is configured as a buffer layer, and remaining layers are configured as storage layers;

wherein when the initial position is a container position of the buffer layer, the target position is a container position of the storage layer;

wherein when the initial position is a container position of the storage layer, the target position is a container position of the buffer layer; and wherein the transport method further comprises moving the container to the buffer layer by a mobile robot, or moving a container of the buffer layer to a specified location.

* * * * *